(12) United States Patent
Wang et al.

(10) Patent No.: US 12,017,371 B2
(45) Date of Patent: Jun. 25, 2024

(54) EFFICIENT AND ROBUST LINE MATCHING APPROACH

(71) Applicant: FANUC CORPORATION, Yamanashi (JP)

(72) Inventors: Kaimeng Wang, Fremont, CA (US); Yongxiang Fan, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 311 days.

(21) Appl. No.: 17/654,909

(22) Filed: Mar. 15, 2022

(65) Prior Publication Data
US 2023/0294291 A1   Sep. 21, 2023

(51) Int. Cl.
*B25J 9/16*   (2006.01)
*G06T 7/00*   (2017.01)
(Continued)

(52) U.S. Cl.
CPC .......... *B25J 9/1697* (2013.01); *B25J 9/1607* (2013.01); *B25J 9/1653* (2013.01); *B25J 9/1664* (2013.01); *B25J 9/1684* (2013.01); *G06T 7/0004* (2013.01); *G06T 7/60* (2013.01); *G06T 7/74* (2017.01); *G05B 2219/39397* (2013.01); *G05B 2219/40564* (2013.01); *G06T 2207/30164* (2013.01)

(58) Field of Classification Search
CPC ...... B25J 9/1697; B25J 9/1607; B25J 9/1653; B25J 9/1664; B25J 9/1684; G06T 7/001; G06T 7/60; G06T 2207/30164; G06F 18/22; G05B 2219/39397; G05B 2219/40564

See application file for complete search history.

(56) References Cited

U.S. PATENT DOCUMENTS 9,292,932 B2   3/2016   Kitajima
9,672,630 B2   6/2017   Namiki et al.
(Continued)

OTHER PUBLICATIONS

L. Zhang, R. Koch, An efficient and robust line segment matching approach based on LBD descriptor and pairwise geometric consistency, J. Vis. Commun. Image R. (2013), doi: http://dx.doi.org/10.1016/j.jvcir.2013.05.006.

(Continued)

*Primary Examiner* — Joseph M Rocca
*Assistant Examiner* — Benjamin J Brosh
(74) *Attorney, Agent, or Firm* — John A. Miller; Shumaker, Loop & Kendrick LLP (57) ABSTRACT

A method for line matching during image-based visual servoing control of a robot performing a workpiece installation. The method uses a target image from human demonstration and a current image of a robotic execution phase. A plurality of lines are identified in the target and current images, and an initial pairing of target-current lines is defined based on distance and angle. An optimization computation determines image transposes which minimize a cost function formulated to include both direction and distance between target lines and current lines using 2D data in the camera image plane, and constraint equations which relate the lines in the image plane to the 3D workpiece pose. The rotational and translational transposes which minimize the cost function are used to update the line pair matching, and the best line pairs are used to compute a difference signal for controlling robot motion during visual servoing.

20 Claims, 6 Drawing Sheets

(51) Int. Cl.
    *G06T 7/60*     (2017.01)
    *G06T 7/73*     (2017.01)

(56) References Cited

U.S. PATENT DOCUMENTS

| | | |
|---|---|---|
| 9,943,961 B2 | 4/2018 | Nakazato et al. |
| 10,406,686 B2 | 9/2019 | Boca et al. |
| 10,486,306 B2 | 11/2019 | Shibata |
| 10,520,912 B2 | 12/2019 | Wang et al. |
| 11,059,169 B2 | 7/2021 | Suzuki et al. |
| 11,130,236 B2 | 9/2021 | Chen et al. |
| 2021/0316449 A1 | 10/2021 | Wang et al. |

OTHER PUBLICATIONS

M. Alshawa, A Novel Point Cloud Registration Algorithm Based on Linear Features.

EFFICIENT AND ROBUST LINE MATCHING APPROACH

BACKGROUND

Field

The present disclosure relates to the field of industrial robot motion control and, more particularly, to a line matching method for visual servoing control of a robot performing a workpiece placement operation, where the visual servoing uses image-based line matching on a workpiece between a human demonstration phase and a robotic execution phase, the line matching uses an optimization function to find the best line pair matching, and the line matching is performed using two-dimensional data in the camera image plane in order to avoid inaccuracies in three-dimensional depth data.

Discussion of the Related Art

The use of industrial robots to repeatedly perform a wide range of manufacturing, assembly and material movement operations is well known. However, teaching a robot to perform even a fairly simple operation—such as picking up a workpiece in a random position and orientation on a conveyor and moving the workpiece to a container or a second conveyor—has been unintuitive, time-consuming and/or costly using conventional methods. Teaching robots to perform more precise operations such as component assembly has been even more problematic.

Robots have traditionally been taught to perform pick and place operations of the type described above by a human operator using a teach pendant, or by using a motion capture system to record the movements of the human operator. However, the use of teach pendants is slow and unintuitive, and motion capture systems are expensive and time-consuming to set up. The shortcomings of these traditional systems has led to the development of robot teaching methods by human demonstration using cameras but no teach pendant and no motion capture system. Teaching by human demonstration from camera images is an improvement over traditional methods in many applications.

Teaching by human demonstration from camera images may lack the positional accuracy needed for precise placement of the workpiece, as is needed for applications such as component installation into an assembly. To overcome this limitation, visual servoing control can be added to the final stage of component placement. One problem with visual servoing is reliably matching geometric features of the workpiece from the human demonstration images to corresponding features of the workpiece from images of the robot operation. If geometric features in the images are not accurately matched, the resulting component assembly operation will not be successful.

In light of the circumstances described above, there is a need for an improved line matching technique for visual servoing control of robotic installation and assembly operations.

SUMMARY

In accordance with the teachings of the present disclosure, a method for line matching during image-based visual servoing is presented. The line matching is employed during visual servoing control of a robot performing an installation of a workpiece by comparing a target image from a human demonstration phase with a current image of a robotic execution phase. A plurality of lines are identified in the target and current images, and an initial pairing of target-current lines is defined based on distance and angle. An optimization computation determines image transposes which minimize a cost function formulated to include both direction and distance between target lines and current lines using 2D data in the camera image plane, and constraint equations which relate the lines in the image plane to the 3D workpiece pose. The rotational and translational transposes which minimize the cost function are used to update the line pair matching, and the best line pairs are used to compute a difference signal for controlling robot motion during visual servoing.

Additional features of the presently disclosed devices and methods will become apparent from the following description and appended claims, taken in conjunction with the accompanying drawings.

DETAILED DESCRIPTION OF THE EMBODIMENTS

The following discussion of the embodiments of the disclosure directed to a line matching technique for use in image-based visual servoing robot control is merely exemplary in nature, and is in no way intended to limit the disclosed devices and techniques or their applications or uses.

It is well known to use industrial robots for a variety of manufacturing, assembly and material movement operations. One known type of robotic operation is sometimes known as "pick, move and place", where a robot picks up a part or workpiece from a first location, moves the part and places it at a second location. The first location might be a conveyor belt where randomly oriented parts are streaming, such as parts which were just taken from a mold. The second location may be another conveyor leading to a different operation, or may be a shipping container, but in either case, the part needs to be placed at a particular location and oriented in a particular pose at the second location.

A more specialized type of robot part movement involves having the robot pick up a component part and install the component into an assembly. Component installation in an assembly typically requires much more precise placement of the component (workpiece) than other applications where the workpiece is simply placed on a conveyor, for example. Because of this need for precision placement, robotic component assembly operations have been difficult to teach, especially considering that variations in the robot grasp of the workpiece result in variations in the workpiece placement.

Robot teaching by human demonstration is also known, where a camera captures images of the human hand(s) moving the workpiece from a start (pick) location to a destination (place) location. Teaching by human demonstration from camera images may lack the positional accuracy needed for precise placement of the workpiece, as is needed for applications such as component installation into an assembly. To overcome this limitation, visual servoing control can be added to the final stage of component placement. Techniques for robot teaching by human demonstration with visual servoing control were disclosed in U.S. patent application Ser. No. 17/457,688, titled ROBOT TEACHING BY DEMONSTRATION WITH VISUAL SERVOING, filed Dec. 6, 2021 and commonly assigned with the present application, and herein incorporated by reference in its entirety. The aforementioned application is hereinafter referred to as "the '688 application".

Figure 1:
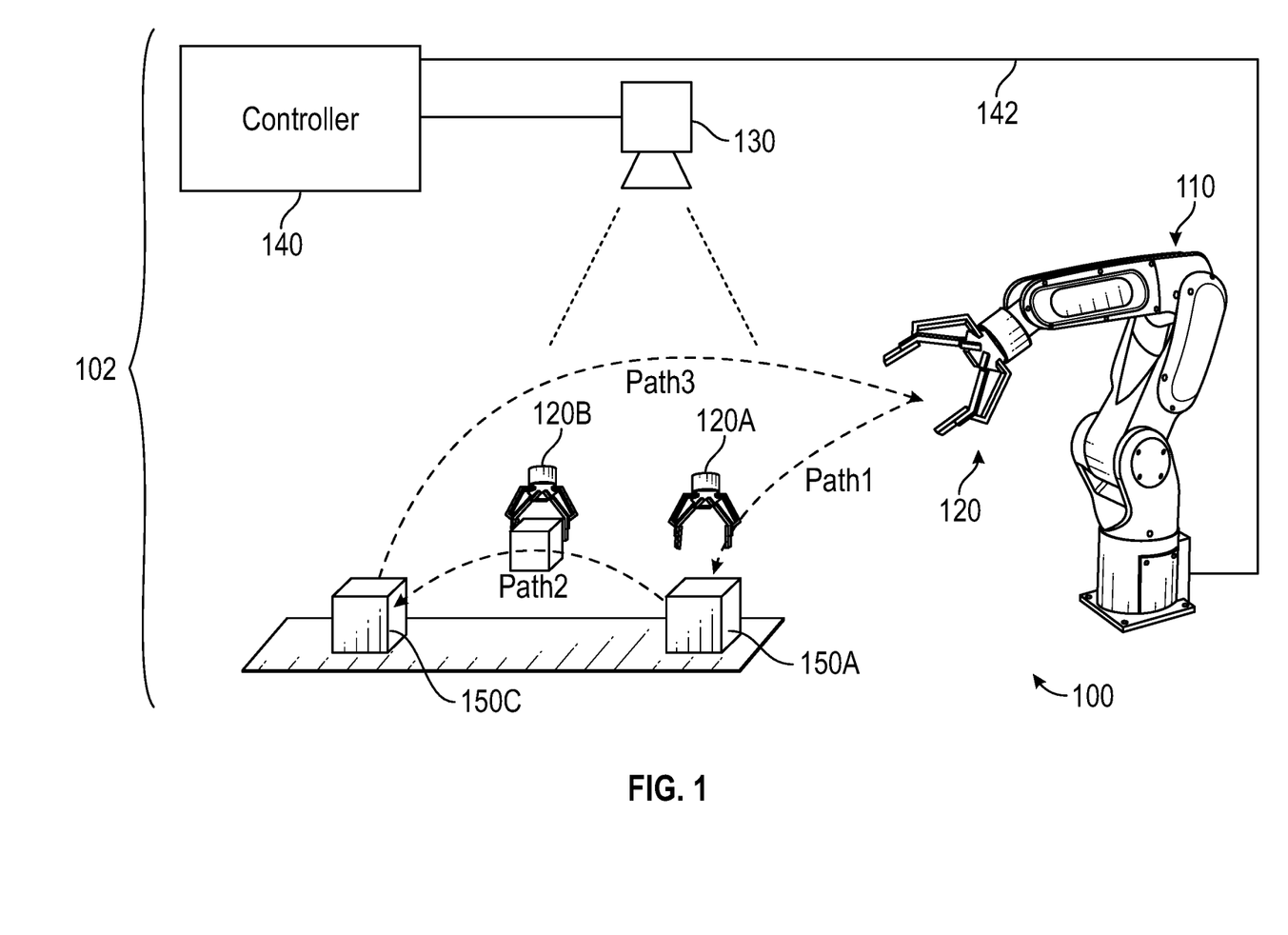
FIG. 1 is an illustration of a system for a robot to perform a pick and place operation using camera images of a workpiece and a trajectory previously taught by human hand demonstration, including the use of image-based visual servoing, according to an embodiment of the present disclosure.

FIG. 1 is an illustration of a system 100 for a robot to perform a pick and place operation using camera images of a workpiece and a trajectory previously taught by human hand demonstration, including the use of image-based visual servoing (IBVS), as disclosed in the '688 application and used in an embodiment of the present disclosure. The system 100 is located in a work cell 102, including a camera 130 communicating with a controller 140. The work cell 102, the camera 130 and the controller 140 will have been used previously for human demonstration of the component movement and installation, as discussed further below. In addition to the camera 130 and the controller 140, the work cell 102 includes a robot 110 in communication with the controller 140, typically via a physical cable 142. The robot 110 operates a gripper 120.

The system 100 is designed to "replay" the pick, move and place operations taught by the human operator. The hand and workpiece position data recorded in the pick, move and place steps are used to generate robot programming instructions as follows. The robot 110 move the gripper 120 along Path1 to position 120A to pick up a workpiece 150 at position 150A. The gripper 120 (shown as 120B) then moves the workpiece 150 along Path2 to a position 150C, which is the final (installed) position. The robot 110 then moves the gripper 120 along Path3 back to a home position.

In the system 100 described above, the final installed position of the workpiece 150C is defined by the final workpiece position from the human demonstration phase. Furthermore, image-based visual servoing (IBVS) may be used during the final portion of Path2 to precisely align the workpiece 150 during robot installation, to match the final workpiece position from human demonstration. The use of IBVS robot control eliminates the uncertainty of robot grasping precision by comparing images of the workpiece after human demonstration (installation) directly with images of the workpiece during robotic installation.

One problem with image-based visual servoing is reliably matching geometric features of the workpiece from the human demonstration images to corresponding features of the workpiece from images of the robotic installation operation. If geometric features in the images are not accurately matched, the resulting placement of the component will be inaccurate, and the component installation will not be successful.

Many different types of geometric features on the object (workpiece) may be tracked in IBVS. These includes points, lines, circles, other ellipses, cylinders and even irregular shapes where a position error can be computed via a double integral image moment calculation. In general, the use of point features is not robust to variations of a real robotic environment. For example, an apparent position of a point in image space may change due to lighting conditions, and it can be difficult to separate or distinguish different features points because many point features may be located very close together on most objects. On the other hand, IBVS computations associated with complex 2D and 3D shapes can become lengthy, and many objects do not have geometric features such as circles and cylinders which can be used. In the end, the selection of feature types may be made to best suit a particular object (workpiece) and installation application. For many types of workpieces, line features provide the best combination of robustness and computational simplicity.

Figure 2A:
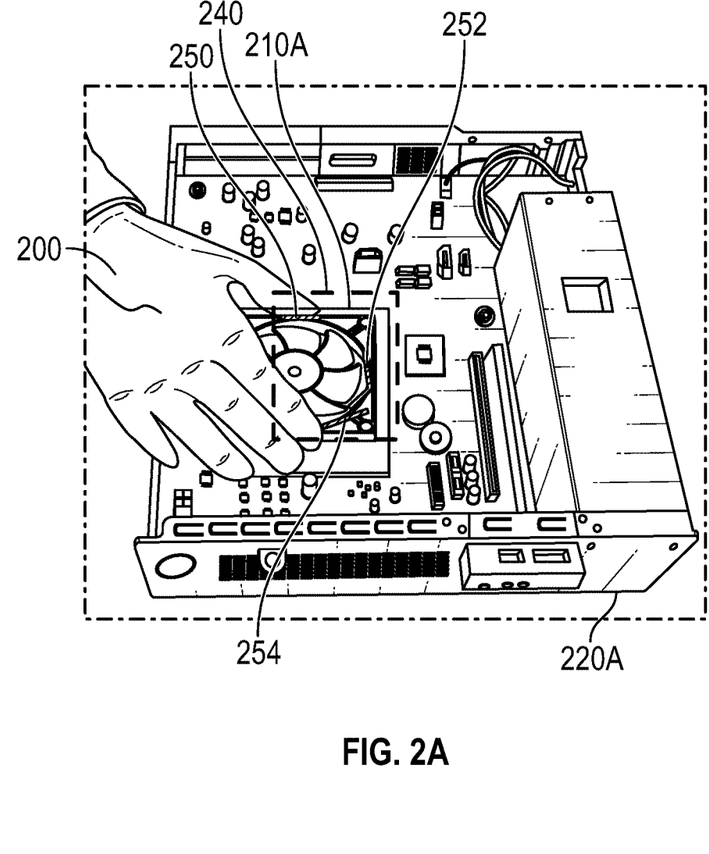
FIGS. 2A and 2B are illustrations of a workpiece being installed in an assembly by human demonstration and by robot, respectively, where the final stage of robot positioning is controlled by image-based visual servoing, according to an embodiment of the present disclosure.
Figure 2B:
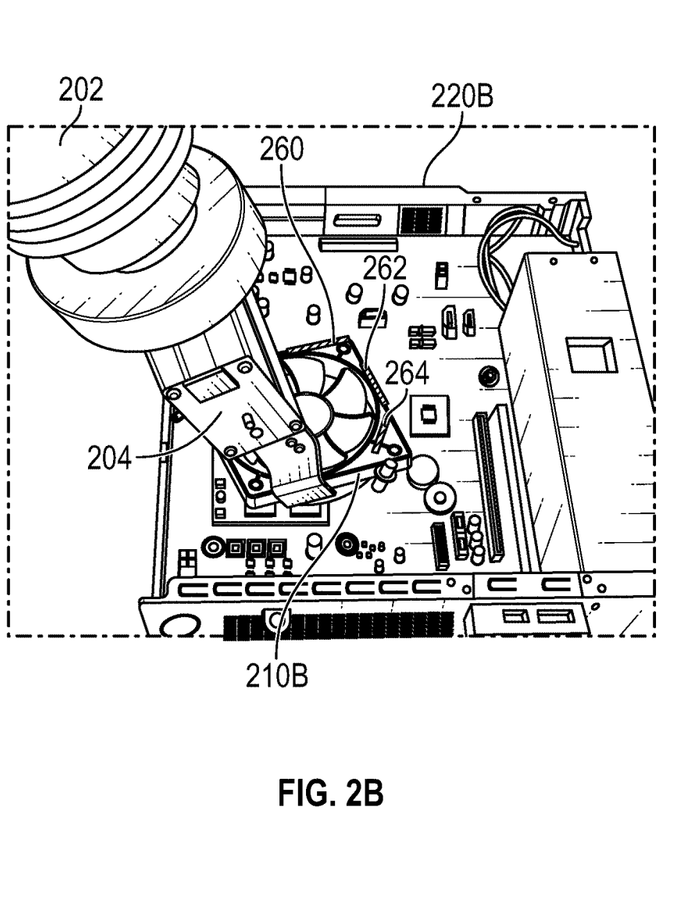

FIGS. 2A and 2B are illustrations of a workpiece being installed in an assembly by human demonstration and by robot, respectively, where the final stage of robot positioning is controlled by image-based visual servoing, according to an embodiment of the present disclosure. The example used in FIGS. 2A/2B and throughout the remainder of the present disclosure is a cooling fan being installed into an electronic device assembly such as a computer chassis. The installation of the computer fan may involve precise alignment of multiple mechanical features (such as pins into holes) and electrical contacts (such as blades into slots). Because of the require placement precision, any positional or rotational misalignment of the fan unit with the assembly will result in failure of the installation step.

In FIG. 2A, a human demonstrator (only a hand 200 is visible) installs a workpiece 210A into an assembly 220A. The demonstrator performs this task by first picking up the workpiece 210A from a nearby location such as a tabletop or a tray, and moving the workpiece 210A to its installed position indicated by a box 240. The human demonstrator uses his/her visual and tactile senses to properly position the workpiece 210A with respect to the assembly 220A such that the mechanical features and electrical contacts align. The human demonstrator then installs the workpiece 210A, such as by pressing downward so that friction and/or a mechanical snap-lock hold the workpiece 210A in the assembly 220A.

One or more camera captures images of the human demonstration, as discussed earlier. The camera images can be used to define an overall trajectory of the workpiece from a location outside the assembly 220A to the box 240, as described in the '688 application, and as shown in FIG. 1. In addition, an image of the workpiece 210A in its final installed position is used for IBVS control of the robotic installation process, as also described in the '688 application.

IBVS control involves matching geometric features from a target or desired image (the workpiece as installed by the human) with like features from current images of a robotic installation. In FIG. 2A, lines 250, 252 and 254 (shown in a diagonal hatch line font) represent linear features of the workpiece 210A detected in the camera image. The lines 250, 252 and 254 will later be compared to workpiece line features identified in the camera image of FIG. 2B.

In FIG. 2B, a robot arm 202 and gripper 204 are seen manipulating a workpiece 210B for installation in an assembly 220B. The image of FIG. 2B has been analyzed, and lines 260, 262 and 264 have been identified which represent linear features of the workpiece 210B detected in the camera image. During IBVS control of the robot, the workpiece 210B will be manipulated by the robot/gripper to cause the line 260 to align with the line 250, the line 262 to align with the line 252, and the line 264 to align with the line 254. Manipulating the workpiece 210B in this manner will result in a successful installation of the component into the assembly.

As mentioned above, success of an IBVS robotic component installation relies on accurately matching workpiece line features from the target image (previous demonstration) with corresponding workpiece line features from a current image of robotic installation. In IBVS control, the target image is preferably taken by the same camera in the same workcell as the robotic installation will take place. Techniques for line matching between two images are known in the art, but these existing line matching techniques are lacking in one way or another. An existing technique known as line band descriptor (LBD) uses surrounding pixel values in a gradient calculation to describe a line segment. However, this LBD technique is more suitable to matching two images of an identical scene from different points of view, and therefore tends to be unsuitable to IBVS. Another known line matching technique calculates a rotational and a translational transpose between two candidate lines using three-dimensional (3D) data. However, due to inaccuracies known to typically exist in 3D pixel depth data, this technique can suffer from corresponding inaccuracy.

The present disclosure describes a technique for line matching between two images which calculates transposes between candidate line pairs based on two-dimensional (2D) image space data, thereby avoiding the inherent inaccuracies of 3D pixel depth data. The disclosed technique further uses a two-part initial line pairing calculation, and an iterative optimization computation using random line pairs, to maximize line pair matching accuracy. Details of the disclosed technique are described below in connection with FIGS. 3-6.

Figure 3:
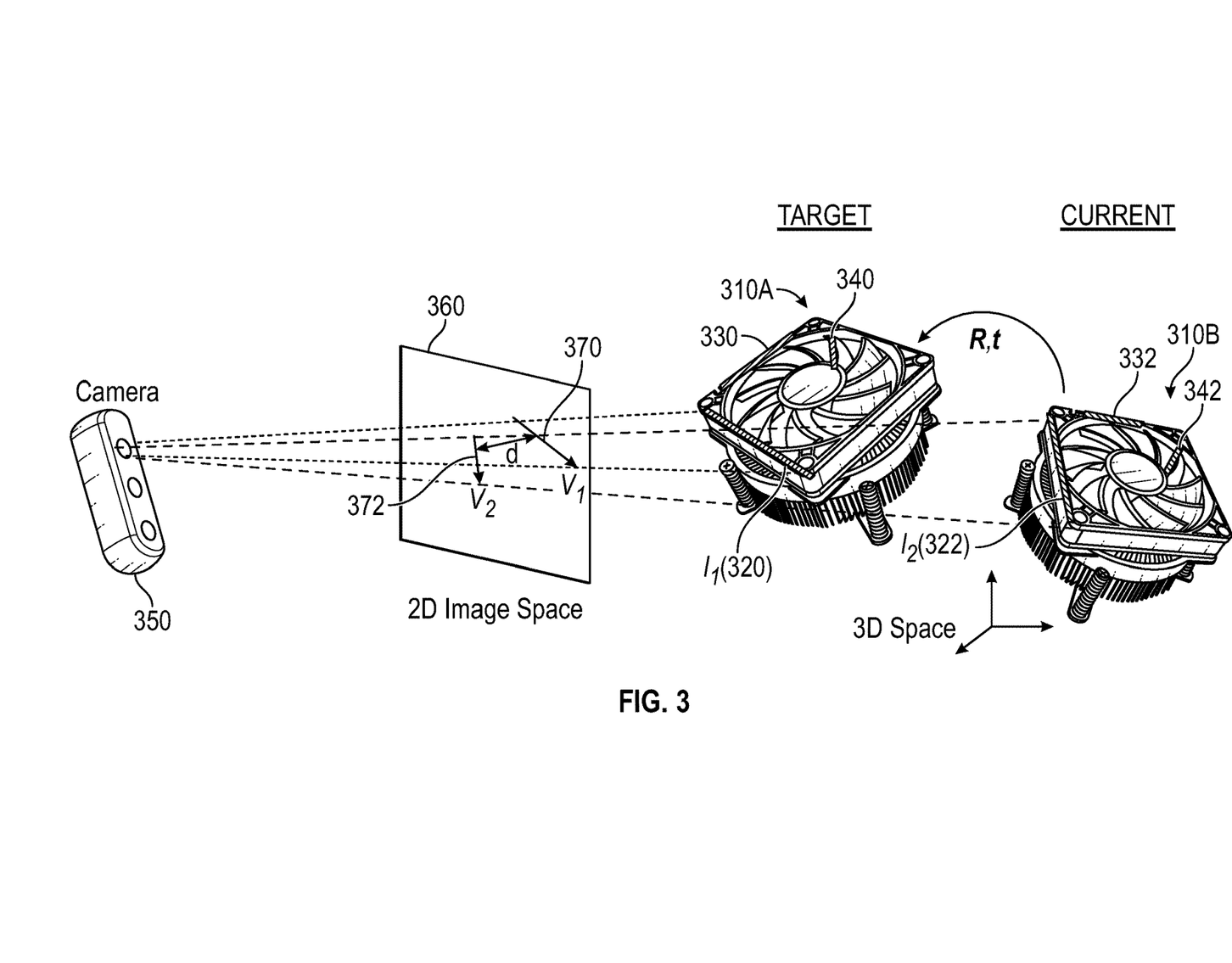
FIG. 3 is an illustration of a technique for defining lines in 2D image space for use in a line matching optimization computation, as part of an image-based visual servoing robot control method, according to an embodiment of the present disclosure.

FIG. 3 is an illustration of a technique for defining lines in 2D image space for use in a line matching optimization computation, as part of an image-based visual servoing robot control method, according to an embodiment of the present disclosure. A workpiece 310 is shown in a pose 310A and a pose 310B in 3D space, where the pose 310A represents a target image (the final pose from the human demonstration phase) and the pose 310B represents a current image from robotic installation. The ultimate goal of the image-based visual servoing is to compute robot motions which cause line features in the current image to be moved toward corresponding line features in the target image. In order to compute the robot motions, it is necessary to accurately match line pairs between the target image and the current image. This line matching, in turn, can be done most accurately by first determining a rotational transpose R and a translational transpose t which minimize a line matching error between the workpiece pose 310B and the workpiece pose 310A.

A line $l_1$ (320) is identified on the workpiece pose 310A and a corresponding line $l_2$ (322) is identified on the workpiece pose 310B. It is tentatively believed (as discussed below) that the line $l_1$ (320) and the line $l_2$ (322) represent the same line feature on the workpiece 310 in the target image and the current image, respectively. Other line pairs 330/332 and 340/342 are similarly identified, although they are not discussed further with respect to FIG. 3.

A 3D camera 350 is used to capture both the target image (with the workpiece 310A) and the current image (with the workpiece 310B). A camera 2D image space (plane) 360 is shown, where the 2D image space 360 represents objects as pixels in a planar (x-y) coordinate system space. A vector $v_1$ (370) in the 2D image space 360 corresponds to the projection of the line $l_1$ (320) from 3D space. Likewise, a vector $v_2$ (372) in the 2D image space 360 corresponds to the projection of the line $l_2$ (322) from 3D space. A distance d between the vectors $v_1$ (370) and $v_2$ (372) is defined in any suitable manner, such as the distance between the midpoints of the vectors $v_1$ (370) and $v_2$ (372).

Using the relationships described above and shown in FIG. 3, a cost function can be defined which minimizes the error in the transposed lines in 2D image space based on a selected set of n line pairs. The cost function and corresponding constraint equations are as follows:

$$\min_{R,t} \sum_n w_1 \|v_1 - v_2\|_2 + w_2 d \quad (1)$$

$$\text{s.t.} \quad l_1^{2d} = P \cdot l_1^{3d} \quad (2)$$

$$l_2^{2d} = P \cdot [Rt] \cdot l_2^{3d} \quad (3)$$

Where R and t are the rotational and translational transpose values described above, P is a known camera projection matrix relating positions in 3D space to pixel locations in 2D image space, $l_1^{2d}$ is the projection of the line $l_1$ in 2D image space and is equal to $v_1$, $l_2^{2d}$ is the projection of the line $l_2$ in 2D image space and is equal to $v_2$, and $l_1^{3d}$ and $l_2^{3d}$ are the lines $l_1$ and $l_2$ in 3D, respectively. Finally, $w_1$ and $w_2$ are weighting factors on a vector direction term ($w_1$) and a vector distance term ($w_2$) in the cost function summation of Equation (1).

By defining the cost function of Equation (1) in 2D image space, the technique of the present disclosure avoids inaccuracies associated with pixel depth data.

FIG. 3 illustrates three potential line pairings between the target image and the current image. These are the line $l_1$ (320) paired with the line $l_2$ (322), the line pair (330/332) and the line pair (340/342). With these three line pairs so defined, the optimization of Equations (1)-(3) would be computed for all three line pairs (n=3). In a real world example, many more lines are typically defined in the target image and the current image, and the challenge is in properly matching each line in the current image with its proper corresponding line in the target image. This is illustrated in subsequent figures and discussed further and below.

Figure 4A:
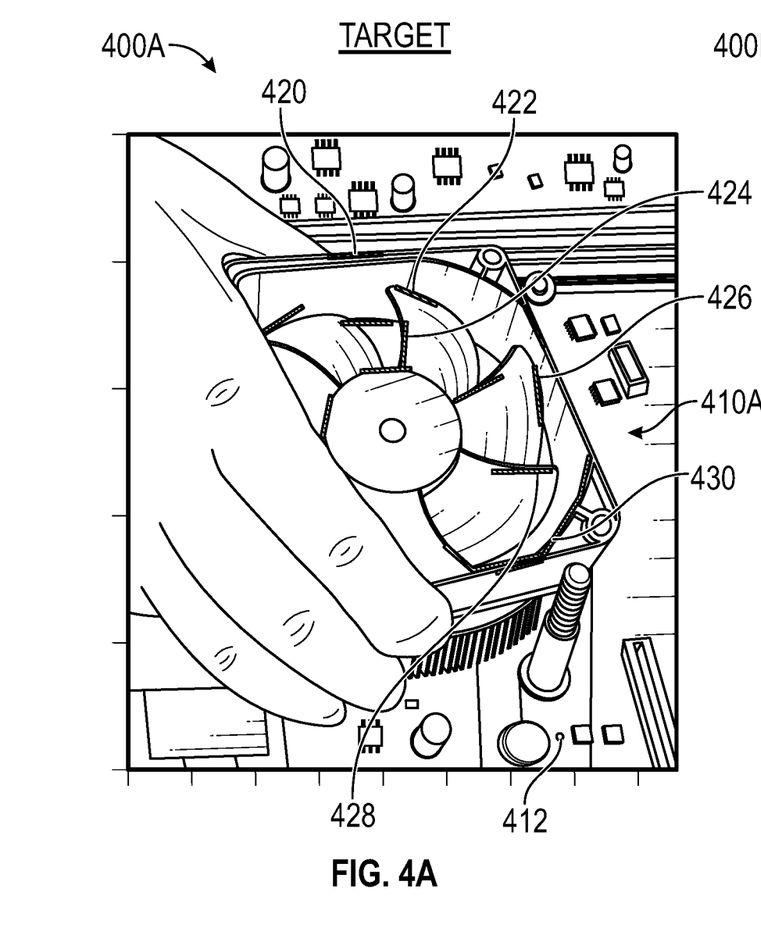
FIG. 4A is an illustration of a target image of a workpiece as installed in an assembly by a human demonstrator.
Figure 4B:
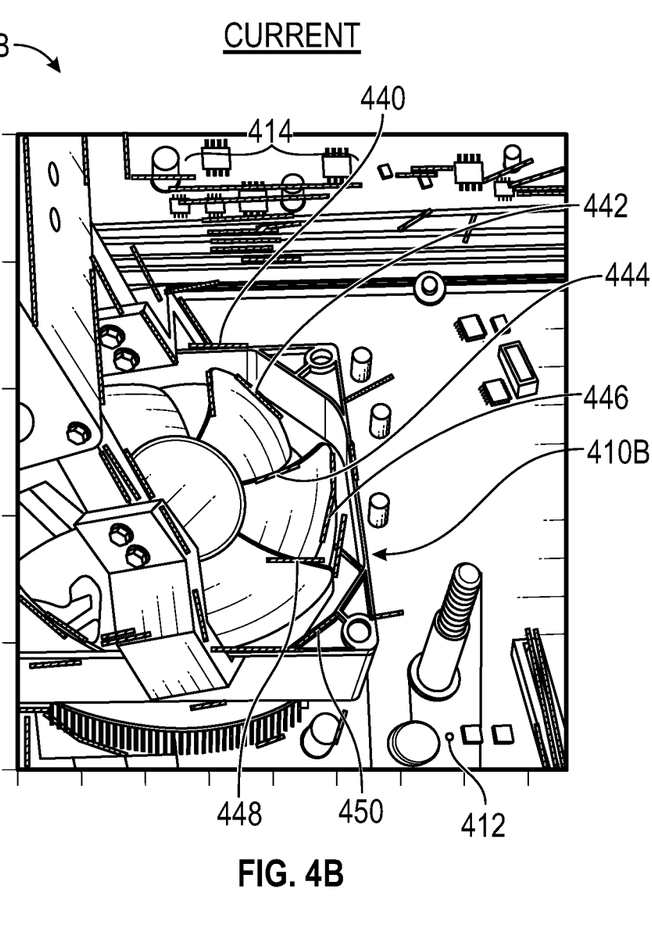
FIG. 4B is an illustration of a current image of the workpiece being installed in the assembly by a robot, with a plurality of lines on the workpiece identified in both the target image and the current image, according to an embodiment of the present disclosure.

FIG. 4A is an illustration of a target image 400A of a workpiece 410A as installed in an assembly 412 by a human demonstrator, and FIG. 4B is an illustration of a current image 400B of the workpiece 410B being installed in the assembly 412 by a robot, with a plurality of lines on the workpiece identified in both the target image 400A and the current image 400B, according to an embodiment of the present disclosure.

Techniques for cropping a target image (the human demonstration image) to a working area which essentially includes only the workpiece were disclosed in the '688 application. These techniques include identifying pixel areas where movement is occurring, and subtracting out features known to belong to the human hand. Even when these techniques are applied such that linear features are only detected on the workpiece itself, it is still common for many lines to be defined in the target image 400A, especially in the case of the cooling fan workpiece, which has many short linear geometric features. In FIG. 4A, over a dozen lines are identified on the workpiece 410A in the target image 400A. Not all of these lines are given reference numbers, to avoid unnecessary clutter on the drawing figure. Lines 420-430 are identified and discussed further with respect to the line matching procedure.

The current image 400B represents just one of a continuous sequence of images which are taken during the robotic installation controlled by visual servoing. Because the current images are provided in rapid succession in real time, there may be little or no time available for preprocessing the current images to filter out unnecessary lines. Thus, many lines may be identified in the current images which are not even associated with the workpiece 410B. Many such lines are visible in an area designated as 414. On the workpiece 410B itself, again over a dozen lines are identified in the current image 400B. Not all of these lines are given reference numbers, to avoid unnecessary clutter on the drawing figure. Lines 440-450 are identified on the workpiece 410B in the current image 400B, and discussed further with respect to the line matching procedure.

The lines 420-430 in FIG. 4A and the lines 440-450 in FIG. 4B are shown for the purposes of the ensuing discussion of the disclosed line matching procedure. The lines 420-450 are not meant to exactly match specific features on the drawing illustrations, which were based on actual camera images of a human demonstration and a robotic installation controlled by visual servoing.

By definition, during image-based visual servoing, the workpiece 410B in the current image 400B is in a different position and/or orientation than the workpiece 410A in the current image 400A, because the workpiece 410B is still being manipulated by the robot toward its final position. Because of this, it can be difficult to accurately match lines between the target and current images, especially when many lines are present in each image. To overcome this problem, the techniques of the present disclosure use a three-step line matching procedure, discussed below.

The first step of the disclosed line-matching procedure is to create initial line pairings between lines in the target image and lines in the current image. This first step itself comprises two sub-steps—an angle similarity comparison, and a distance comparison. For the following discussion, consider the lines 420-430 on the workpiece 410A (in the target image 400A) to be designated as Line A, Line B, Line C, Line D, Line E and Line F. Likewise, consider the lines 440-450 on the workpiece 410B (in the current image 400B) to be designated as Line P, Line Q, Line R, Line S, Line T and Line U.

In Step 1.1 (angle similarity comparison), each line on the workpiece 410A (in the target image 400A) is matched with several lines on the workpiece 410B (in the target current 400B) based on a comparison of the apparent angles of the lines in 2D image space. For example, the angle of Line A from the target image 400A is compared to the angle of all of the lines in the current image 400B, and a rank ordering is created which lists the lines in order of increasing angular difference; in other words, the line from the current image 400B with the angle which is closest to the angle of Line A is listed first, the line with the next closest angle is listed second, and so on.

Based on the calculation described above, Step 1.1 (angle similarity comparison) results in a rank-ordered list of similarly-angled lines from the current image 400B for every line in the target image 400A. The angle similarity listing is shown in the following table.

TABLE 1

| Line from Target Image | Rank-Ordered List of Lines from Current Image Based on Angle Similarity |
|---|---|
| Line A → | Line T, Line R, Line P, . . . |
| Line B → | Line Q, Line T, Line U, . . . |
| . . . | . . . |
| Line F → | Line S, Line P, Line Q, . . . |

In Step 1.2 (distance comparison), the distance from each line on the workpiece 410A (in the target image 400A) to each line in its rank-ordered list from the angle similarity is calculated. For example, from Table 1, the distance from Line A to Line T is calculated, along with the distance from Line A to Line R, the distance from Line A to Line P, etc.

Distance for each line pair is calculated as follows. If the two lines "overlap" in 2D image space (that is, if a first line in the pair can be projected along a perpendicular vector and intersect part of the second line in the pair), then the distance at each overlapping end is calculated, and the maximum of those two distances is used. If the two lines in a pair do not overlap in 2D image space, then the distance from the center of one line in the pair to the center of the other line in the pair is used as the distance.

For each line on the workpiece 410A (in the target image 400A), if the top-ranked line from the angle similarity is also the closest line in the distance calculation, then that line is identified as the initial line pair. If the distance comparison does not match the angle comparison, then a weighted comparison of angle difference and distance may be used to identify the best matching line for the initial pairing.

Based on the calculations described above, Step 1.2 (distance and angle comparison) results in 1:1 pairing of a line from the current image 400B which best matches each line in the target image 400A. The initial pairing based on both angle similarity and distance is shown in the following table.

TABLE 2

| Line from Target Image | Initial Line Pairing from Current Image |
|---|---|
| Line A → | Line R |
| Line B → | Line Q |
| . . . | . . . |
| Line F → | Line S |

It is emphasized that the line pairing from the angle and distance comparison, shown in Table 2, is just an initial pairing. Some of the line pairings in this initial pairing may not be accurate pairings of actual geometric features in the target and current images; however, the disclosed line matching procedure is robust enough to handle this type of uncertainty. This will be explained further in the following discussion. It should also be kept in mind that there will typically be far more than six lines in each of the target image and the current image. This fact is also important in the computations discussed below.

The second step of the line-matching procedure is to randomly select multiple pairs of lines from the initial pairing (first step), and perform an optimization computation to find the best values of the transposes R and t to minimize the cost function discussed earlier. In the following discussion of the example shown in FIGS. 5A and 5B, four randomly selected pairs of lines are used; however, fewer (three) or more (five or more) line pairs may be selected.

Figure 5A:
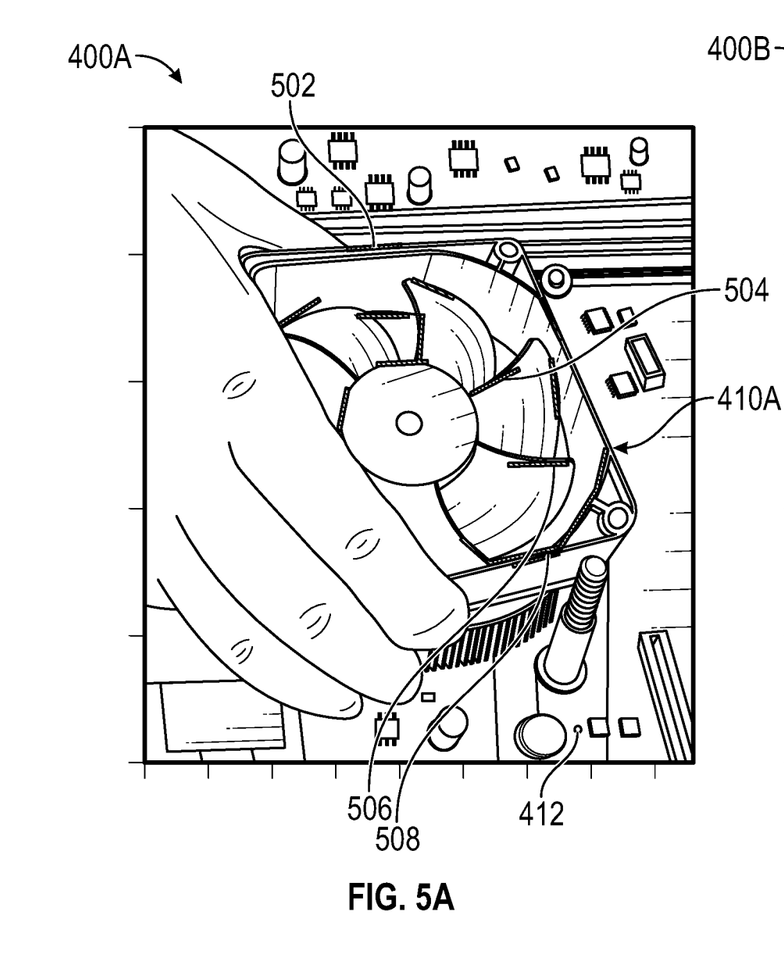
FIG. 5A is an illustration of the target image of FIG. 4A.
Figure 5B:
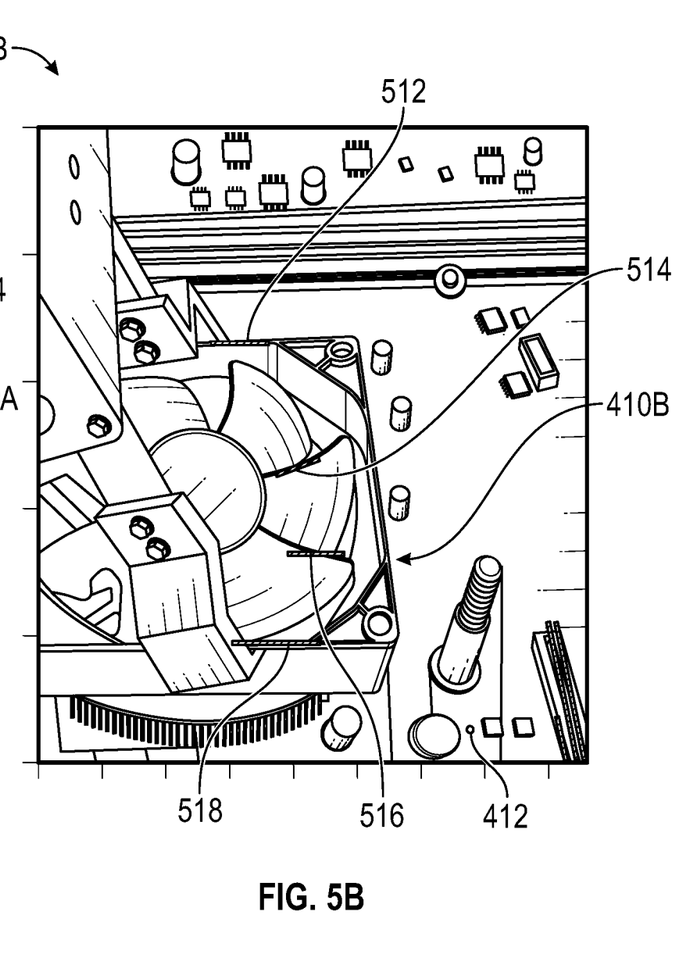
FIG. 5B is an illustration of the current image of FIG. 4B, with four lines on the workpiece identified in both the target image and the current image, where the four lines in each image represent an initial line pairing to be used in a line matching optimization computation, according to an embodiment of the present disclosure.

FIG. 5A is an illustration of the target image 400A of FIG. 4A, and FIG. 5B is an illustration of the current image 400B of FIG. 4B, with four lines on the workpiece identified in both the target image and the current image, where the four lines in each image represent an initial line pairing to be used in a line matching optimization computation, according to an embodiment of the present disclosure.

FIGS. 5A and 5B differ from FIGS. 4A and 4B only in the lines identified on the workpiece. In FIG. 5A, only four lines (502-508) are shown on the workpiece 410A, and in FIG. 5B, a corresponding four lines (512-518) are shown on the workpiece 410B. The four lines 502-508 on the workpiece 410A and the four lines 512-518 on the workpiece 401B represent four line pairs selected for a first iteration of the line matching optimization computation. From the initial pairing calculation discussed above, the line 502 was paired with the line 512, with the other line pairings being (504, 514), (506, 516) and (508, 518). Again it is emphasized that many more lines and line pairings would be available in the target and current images, as illustrated in FIGS. 4A and 4B.

The second step of the line-matching procedure is to perform an optimization computation using the selected four line pairs. In the earlier discussion of FIG. 3, it was described how an optimization computation could be employed to find transpose values R and t which minimize a cost function. The cost function and associated constraints were defined above as Equations (1)-(3). Equations (1)-(3) are defined in terms of a pair of lines, $l_1$ and $l_2$, where $l_1$ is a line representing a geometric feature in a target image, and $l_2$ is a line representing what is believed to be the same geometric feature in a current image. Using the initial line pairings, the optimization computation of Equations (1)-(3) can now be run with the four line pairs of FIGS. 5A and 5B. In other words, n=4, and Equations (1)-(3) are computed for each of the four line pairs—(502, 512), (504, 514), (506, 516) and (508, 518)—and the optimization converges to the values of R and t which minimize the objective function for these four line pairs.

The second step of the line-matching procedure (optimization computation) may be repeated as many times as necessary to achieve a desired level of accuracy in the values of R and t—each time using a different randomly selected four pairs of lines from the initial pairing.

The third step of the line-matching procedure is to evaluate a total error of all paired lines based on the values of R and t which were just computed in the most recent optimization computation. The total error e is computed as follows:

$$e = \sum_m w_1 \|v_1 - v_2\|_2 + w_2 d \quad (4)$$

Where $v_1$ is the target image line in 2D image space, $v_2$ is the pair-matched current image line in 2D image space after the rotational and translational transposes R and t described above, d is the distance between $v_1$ and $v_2$ as before, and $w_1$ and $w_2$ are weighting factors as before. The total number of line pairs is m. For example, in Table 2 there were six line pairs (Lines A-F, and m=6). In actual implementation, a higher number of lines (such as 10-20) may be identified on the target image, as illustrated in FIG. 4A, and a line pair match defined for each of these many lines. Thus, in actual implementation, the value of m could be in a range of 10-20, and the total error is computed in a summation including all of the lines.

After the total error e is computed using Equation (4), it is compared to a predefined threshold $\delta$. If the total error is greater than or equal to the threshold (e≥δ), then the process returns to Step 2 where the optimization computation is repeated using a different randomly selected four pairs of lines from the initial pairing. This will result in different values of R and t, and at Step 3 the total error is again computed. This looping through Step 2 and Step 3 continues until the total error is less than the threshold (e<δ), at which point the transpose values R and t are considered to be accurate.

As noted earlier, even if some of the line pairs from the initial pairing at Step 1 are not accurate, the recursive optimization computation and error checking at Steps 2 and 3 will ensure that valid line pairs are ultimately used and accurate values of the transposes R and t are computed.

The line matching optimization computation discussed above provides accurate values of R and t required to transpose the current image (during IBVS robotic control) to match the target image (the final image from human demonstration). These values of R and t are then used to re-pair the lines from the current image and the target image.

The re-pairing of the lines from the current image and the target image is performed by transposing the current image using the optimized values of R and t and then, using the new positions of the current image lines, re-applying the angle and distance calculations used for the initial pairing in Step 1 of the line-matching procedure discussed above. After re-applying the angle and distance calculations, only line pairs which match within a certain tolerance of angle and distance are used for subsequent IBVS control of the robot. That is, if a particular line on the workpiece in the target image does not match closely with a line on the workpiece in the current image after transposing using R and t, then that particular line is not used in the IBVS control calculations. Likewise, some lines on the workpiece in the current image will not be a best match with a line on the workpiece in the target image, and those lines from the current image will not be used in the IBVS control calculations. It is preferable to have at least three well-matched line pairs for the following IBVS control calculations, and this is normally not a problem since there are usually many lines on the workpiece in the target image and the current image.

With the new line pairings, image-based visual servoing control of the robot can be performed with accurate matching of geometric features (lines) from the current image to the target image. A known technique for IBVS control of a robot computes an "error" as a difference between the geometric features in the current image and the corresponding geometric features in the target image, and then uses the error to compute robot gripper motions. This technique is embodied in the following equations:

$$e(t) = X(t) - X_d \quad (5)$$

$$\dot{q} = -\lambda J^\dagger e(t) \quad (6)$$

Where q̇ is the robot motion (velocity) vector to be applied by the robot controller, e(t) is the "error", $J^\dagger$ is the pseudo-inverse of the known Jacobian matrix (the pseudo-inverse is used because the true inverse of the Jacobian may not be able to be calculated directly), and λ is a constant. In Equation (5), $X_d$ is a matrix of lines from the target image (subscript d is for "desired" position) and X(t) is a matrix of lines from the current image which have been matched 1:1 with the lines in $X_d$. The matrix X(t) is changing as a function of time because a new current image is provided for each new robot control cycle. Consider an example where after transposing the current image and re-pairing the lines, there are three high-quality matched line pairs. The three line pairs (using new example line numbers which are not shown on the drawings) are: (Line 20, Line 44), (Line 23, Line 47) and (Line 25, Line 51), where the first line listed in each pair is from the target image and the second line is from the current image. Therefore, in this example, $X_d$=[Line 20, Line 23, Line 25], and X(t)=[Line 44, Line 47, Line 51].

Using the high-quality matched pairs of lines from the target image ($X_d$) and the current image (X(t)), the robot Cartesian velocity vector q̇ is computed using Equations (5) and (6) and used to control an increment of robot motion; then a new current image is provided, and the line matching procedure is again used to provide a set of matched line pairs to use in Equations (5) and (6) to control the next increment of robot motion. This process continues in real time until the IBVS-controlled robot moves the workpiece to the installed position matching the target image from human demonstration.

Also, as mentioned earlier and described in detail in the '688 application, the robot might be programmed to pick up the workpiece and move the workpiece along most of a predefined trajectory (where the trajectory is also taught by human demonstration), and then IBVS control used only for the final stage of installation where fine precision placement is needed.

Figure 6:
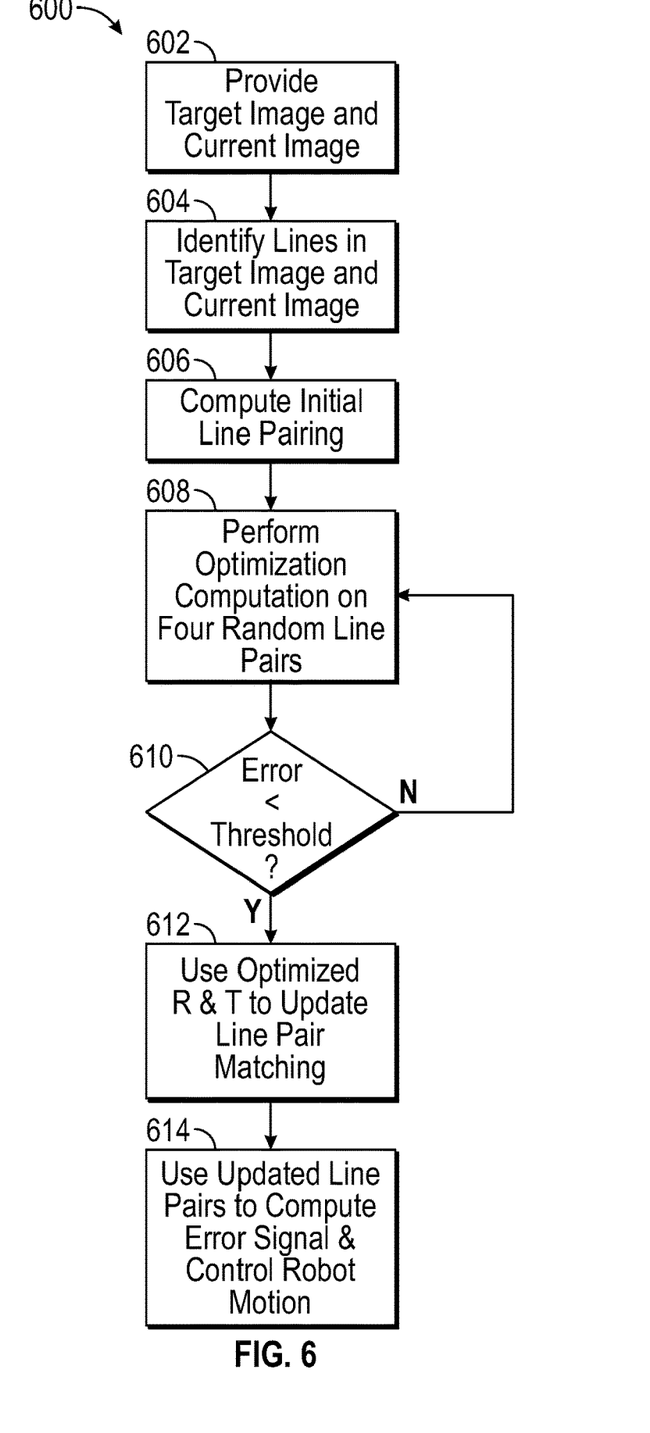
FIG. 6 is a flowchart diagram of a method for line matching during image-based visual servoing robot control, where an optimization computation is used to match line pairs and determine a rotational and translational transpose between a workpiece in a current image and in a target image, according to an embodiment of the present disclosure.

FIG. 6 is a flowchart diagram 600 of a method for line matching during image-based visual servoing robot control, where an optimization computation is used to match line pairs and determine a rotational and translational transpose between a workpiece in a current image and in a target image, according to an embodiment of the present disclosure. At box 602, a target image and a current image are provided. As shown in FIGS. 1 and 2 and discussed earlier, the target image is the final image of the installed workpiece from human demonstration, and the current image is the most recent image of the robotic installation which is being performed using IBVS control. In a preferred embodiment, the images are provided by the camera 130 to the controller 140.

At box 604, lines on the workpiece are identified in the target image and the current image. Because the same target image is used throughout the entire IBVS robotic installation, providing the target image at the box 602 and identifying lines on the workpiece in the target image at the box 604 only needs to be done once. A new current image is used for each robot control cycle, so identifying lines on the workpiece in the current image at the box 604 needs to performed for each new current image.

At box 606, initial line pairings are computed between the lines on the workpiece in the target image and the lines on the workpiece in the current image. This is Step 1 of the line matching procedure as described above, with Step 1.1 computing angle similarity to provide an ordered list of lines from the current image for each line from the target image, and Step 1.2 computing a distance and resulting in a 1:1 initial pairing of lines between the target image and the current image.

At box 608, an optimization computation is performed using four random pairs of lines from the initial pairing. The optimization computation was defined in Equations (1)-(3) discussed earlier, and includes finding transpose values R and t which minimize the cost function Equation (1), where the cost function includes a direction difference term and a distance term between vector projections of the line pairs into 2D image space. At decision diamond 610, a total line matching error e for the just-computed values of R and t is computed using Equation (4), and the error e is compared to a predefined threshold δ. If the error e is not less than the threshold δ, the process loops back to the box 608 to again perform the optimization computation using a new random set of four line pairs.

When the error e is less than the threshold δ, at box 612 the optimized values of R and t are used to update the line pair matching. As discussed earlier, this is done by transposing the current image using R and t, and then re-pairing the lines from the current image to the lines from the target image using the angle and distance calculations as in the initial pairing. The result of the box 612 is three or more well-matched pairs of lines, where each pair matches a line on the workpiece in the target image with a line on the workpiece in the current image.

As mentioned earlier, the optimization computation is described above as using four randomly-selected pairs of lines, which is the number of pairs used in a preferred embodiment. However, fewer (three) or more (five or more) line pairs may be selected.

At box 614, the well-matched line pairs from the box 612 are used to compute robot motions for IBVS control. This is done using Equations (5) and (6) discussed above, where Equation (5) computes an error signal e(t) between a matrix X(t) of lines from the current image and a matrix $X_d$ of lines from the target image, and Equation (6) computes a robot Cartesian velocity vector q̇ from the error signal e(t) and the pseudo-inverse of the Jacobian. The robot Cartesian velocity vector q̇ can be used in an inverse kinematics calculation to compute robot joint velocities used to control the robot, as known in the art. The method of FIG. 6 repeats continuously in real time, with a new current image provided periodically as the robot moves the workpiece, until the workpiece is installed in its final position.

Throughout the preceding discussion, various computers and controllers are described and implied. It is to be understood that the software applications and modules of these computer and controllers are executed on one or more computing devices having a processor and a memory module. In particular, this includes the processors in the robot controller 140 discussed above. Specifically, the processor in the controller 140 is configured to perform the optimization-based line matching for use in IBVS robot control, in the manner discussed above. In an alternate embodiment, a computer separate from the robot controller 140 could be used to perform the line matching computations of the present disclosure, where the computer would provide the matched line pairs or the IBVS control signal to the controller 140.

As outlined above, the disclosed line matching technique for use in image-based visual servoing robot control provides fast and accurate line matching between features in a target image from human demonstration and corresponding features in a current image from robotic execution. The line matching technique includes a cost function which uses 2D image plane data to avoid inaccuracies in 3D depth data, and ultimately provides updated line pairs which ensure that only properly matched geometric features from the target and current images are used to control the robot during image-based visual servoing.

While a number of exemplary aspects and embodiments of a line matching technique for use in image-based visual servoing robot control have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for matching line features for image-based visual servoing (IBVS), said method comprising:
   determining an initial pairing of lines in a target image of a workpiece with lines in a current image of the workpiece based on angle similarity and distance;
   performing an optimization computation using three or more randomly selected pairs of the lines, on a computer having a processor and memory, to determine a rotational and translational transpose which minimize a cost function defined in terms of a direction and a distance between a first and second line in each pair projected into two-dimensional (2D) camera image space;
   repeating the optimization computation using a new three or more randomly selected pairs of the lines until an error in direction and distance for all line pairs, computed from the initial pairing using the rotational and translational transpose, is less than a threshold;
   using the rotational and translational transpose to determine an updated pairing of the lines in the target image with the lines in the current image, where a best-matched set of line pairs from the updated pairing is used in an IBVS robot motion control computation; and
   controlling a robot based on the IBVS robot motion control computation.

2. The method according to claim 1 wherein the target image depicts the workpiece in a desired final position from a prior demonstration, and the current image depicts the workpiece being manipulated by a robot with a gripper.

3. The method according to claim 2 wherein the workpiece in the desired final position is installed in an assembly.

4. The method according to claim 2 wherein the prior demonstration was performed manually by a human demonstrator.

5. The method according to claim 2 wherein the target image and the current image are both provided by a two-dimensional camera or a three-dimensional camera.

6. The method according to claim 1 wherein the lines in the target image and the lines in the current image correspond with geometric features of the workpiece which are identified in image analysis by the computer.

7. The method according to claim 1 wherein determining an initial pairing of the lines includes a first step where an ordered set of lines in the current image are matched with each line in the target image based on an angle similarity, and a second step where a single line from the ordered set is matched with each line in the target image based on a distance.

8. The method according to claim 1 wherein the optimization computation minimizes the cost function for the three or more randomly selected pairs of lines while meeting constraints which project a three-dimensional (3D) representation of the first line into the 2D camera image space and project a 3D representation of the second line after applying the rotational and translational transpose into the 2D camera image space.

9. The method according to claim 8 wherein the cost function minimizes a summation, for all selected pairs of lines, of a weighted direction difference term and a weighted distance term, where the direction difference term is a norm of a difference between the first and second lines in 2D camera image space, and the distance term is a distance between the first and second lines in 2D camera image space.

10. The method according to claim 1 wherein the best-matched set of line pairs is a subset of the updated pairing of the lines comprising three or more pairs of lines where a second line in each pair, after applying the rotational and translational transpose, matches a first line in the pair within a predefined level of accuracy in direction and distance.

11. The method according to claim 1 wherein the IBVS robot motion control computation includes placing first and second lines in the best-matched set of line pairs into first and second matrices, and computing a robot velocity vector as a function of a pseudo-Jacobian matrix multiplied by a difference between the first and second matrices.

12. A method for matching line features for image-based visual servoing (IBVS), said method comprising:
   providing a target image of a workpiece in a desired final position from a prior demonstration, and a current image of the workpiece being manipulated by a robot with a gripper;
   identifying a plurality of lines corresponding with geometric features of the workpiece in each of the target image and the current image;
   determining an initial pairing of the lines in the target image with the lines in the current image based on angle similarity and distance;
   performing an optimization computation using three or more randomly selected pairs of the lines, on a computer having a processor and memory, to determine a rotational and translational transpose which minimize a cost function defined in terms of a direction and a distance between a first and second line in each pair projected into two-dimensional (2D) camera image space;
   computing an error in direction and distance for all line pairs from the initial pairing using the rotational and translational transpose;
   when the error exceeds a threshold, reperforming the optimization computation using a new three or more randomly selected pairs of the lines;
   when the error is less than a threshold, using the rotational and translational transpose to determine an updated pairing of the lines in the target image with the lines in the current image;
   using a best-matched set of line pairs from the updated pairing to compute an IBVS error signal;
   using the error signal to compute robot motion commands; and
   controlling the robot based on the robot motion commands.

13. A system for performing image-based visual servoing robotic manipulation of a workpiece, said system comprising:
   a three-dimensional (3D) camera;
   a robot with a gripper; and a robot controller having a processor and memory, said controller being in communication with the robot and the camera, being configured for;

receiving from the camera a target image of the workpiece in a desired final position from a prior demonstration, and a current image of the workpiece being manipulated by the robot with the gripper;

determining an initial pairing of lines in the target image with lines in a current image based on angle similarity and distance;

performing an optimization computation using three or more randomly selected pairs of the lines to determine a rotational and translational transpose which minimize a cost function defined in terms of a direction and a distance between a first and second line in each pair projected into two-dimensional (2D) camera image space;

repeating the optimization computation using a new three or more randomly selected pairs of the lines until an error in direction and distance for all line pairs, computed from the initial pairing using the rotational and translational transpose, is less than a threshold;

using the rotational and translational transpose to determine an updated pairing of the lines in the target image with the lines in the current image;

using a best-matched set of line pairs from the updated pairing in an IBVS robot motion control computation; and controlling the robot to move the workpiece based on the IBVS robot motion control computation.

14. The system according to claim 13 wherein the workpiece in the desired final position is installed in an assembly.

15. The system according to claim 13 wherein the prior demonstration was performed manually by a human demonstrator.

16. The system according to claim 13 wherein the lines in the target image and the lines in the current image correspond with geometric features of the workpiece which are identified in image analysis by the robot controller.

17. The system according to claim 13 wherein determining an initial pairing of the lines includes a first step where an ordered set of lines in the current image are matched with each line in the target image based on an angle similarity, and a second step where a single line from the ordered set is matched with each line in the target image based on a distance.

18. The system according to claim 13 wherein the optimization computation minimizes the cost function for the three or more randomly selected pairs of lines while meeting constraints which project a three-dimensional (3D) representation of the first line into the 2D camera image space and project a 3D representation of the second line after applying the rotational and translational transpose into the 2D camera image space.

19. The system according to claim 18 wherein the cost function minimizes a summation, for all selected pairs of lines, of a weighted direction difference term and a weighted distance term, where the direction difference term is a norm of a difference between the first and second lines in 2D camera image space, and the distance term is a distance between the first and second lines in 2D camera image space.

20. The system according to claim 13 wherein the IBVS robot motion control computation includes placing first and second lines in the best-matched set of line pairs into first and second matrices, and computing a robot velocity vector as a function of a pseudo-Jacobian matrix multiplied by a difference between the first and second matrices.

* * * * *